United States Patent
Han et al.

(10) Patent No.: US 9,547,385 B2
(45) Date of Patent: Jan. 17, 2017

(54) TOUCH SENSOR INTEGRATED TYPE DISPLAY DEVICE

(71) Applicant: LG Display Co., Ltd., Seoul (KR)

(72) Inventors: Manhyeop Han, Seoul (KR); Juhan Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 112 days.

(21) Appl. No.: 14/548,545

(22) Filed: Nov. 20, 2014

(65) Prior Publication Data

US 2015/0185939 A1  Jul. 2, 2015

(30) Foreign Application Priority Data

Dec. 30, 2013  (KR) .................. 10-2013-0166690

(51) Int. Cl.
*G06F 3/041* (2006.01)
*G02F 1/1333* (2006.01)
*G06F 3/044* (2006.01)

(52) U.S. Cl.
CPC ......... *G06F 3/0412* (2013.01); *G02F 1/13338* (2013.01); *G06F 3/044* (2013.01); *G06F 2203/04107* (2013.01)

(58) Field of Classification Search
None
See application file for complete search history.

(56) References Cited

U.S. PATENT DOCUMENTS

| | | | |
|---|---|---|---|
| 2013/0093718 A1 | 4/2013 | Wang et al. | |
| 2013/0257774 A1 | 10/2013 | Kim et al. | |
| 2013/0328812 A1* | 12/2013 | Kim | G06F 3/044 345/173 |
| 2014/0062943 A1* | 3/2014 | Choi | G06F 3/0412 345/174 |
| 2014/0118299 A1* | 5/2014 | Wang | G06F 3/0416 345/174 |
| 2014/0125626 A1* | 5/2014 | Yang | G02F 1/134336 345/174 |

(Continued)

FOREIGN PATENT DOCUMENTS

| | | |
|---|---|---|
| CN | 103365461 A | 10/2013 |
| KR | 2013-0110906 A | 10/2013 |
| TW | 201316233 A | 4/2013 |

OTHER PUBLICATIONS

Office Action issued in corresponding Taiwanese Patent Application No. 103144151 dated Nov. 27, 2015.

*Primary Examiner* — Ryan A Lubit
(74) *Attorney, Agent, or Firm* — Morgan, Lewis & Bockius LLP

(57) ABSTRACT

A touch sensor integrated type display device includes a plurality of first electrodes each including a plurality of first electrode patterns, which are adjacent to one another in a first direction and are connected to one another through at least one first bottleneck, and a plurality of second electrodes arranged in a second direction crossing the first direction. The first electrodes are arranged in the first direction. The plurality of first electrode patterns and the plurality of second electrodes are alternately disposed along the first direction. At least one unit pixel electrode is disposed correspondingly to each first electrode pattern. Each first electrode pattern includes an electric field shielding portion disposed between the unit pixel electrode and the second electrode.

9 Claims, 6 Drawing Sheets

(56) References Cited

U.S. PATENT DOCUMENTS

| | | | |
|---|---|---|---|
| 2014/0176465 A1* | 6/2014 | Ma | G06F 3/041 345/173 |
| 2015/0022501 A1* | 1/2015 | Kita | G02F 1/13338 345/174 |
| 2015/0268762 A1* | 9/2015 | Wang | G06F 3/0412 345/174 |
| 2015/0309644 A1* | 10/2015 | Sun | G06F 3/0412 345/173 |

* cited by examiner

TOUCH SENSOR INTEGRATED TYPE DISPLAY DEVICE

This application claims the benefit of priority under 35 U.S.C. §119(a) to Korean Patent Application No. 10-2013-0166690 filed on Dec. 30, 2013, which is incorporated by reference herein in its entirety.

BACKGROUND OF THE INVENTION

Field of the Invention

The present invention relates to a display device, and more particularly, to a touch sensor integrated type display device capable of recognizing a user's touch operation.

Discussion of the Related Art

In recent years, various input devices, such as a keyboard, a mouse, a joystick, and a digitizer, have been used to allow users to interface with home appliances or information telecommunication devices. However, when the user makes use of these input devices, user's dissatisfaction increases because the user is required to learn how to use the input devices and the input devices occupy space. Therefore, a convenient and simple input device capable of reducing erroneous operations is required. In response to this demand, a touch sensor for enabling the user to input information by directly touching the screen with his or her hand or a pen was suggested.

The touch sensor has a simple configuration capable of reducing the erroneous operations. The user can also perform an input action without using a separate input device and can quickly and easily manipulate a display device through the contents displayed on the screen. Accordingly, the touch sensor has been applied to various display devices.

The touch sensor used in the display devices may be classified into an add-on type touch sensor and an on-cell type touch sensor. The add-on type touch sensor is configured such that a display device and a touch sensor are individually manufactured and then the touch sensor is attached to an upper substrate of the display device. The on-cell type touch sensor is configured such that components constituting a touch sensor are directly formed on the surface of an upper glass substrate of the display device.

There is a problem of an increase in a thickness of the display device because the add-on type touch sensor has a structure in which the touch sensor is mounted on the display device. Further, the visibility of the display device is reduced by a reduction in brightness of the display device resulting from the increase in the thickness of the display device.

On the other hand, the on-cell type touch sensor shares a glass substrate with the display device because the touch sensor has the structure in which the touch sensor is formed on the surface of the glass substrate of the display device. Therefore, a thickness of the display device using the on-cell type touch sensor is less than a thickness of the display device using the add-on type touch sensor. However, the entire thickness of the display device using the on-cell type touch sensor increases because of a touch driving electrode layer, a touch sensing electrode layer, and an insulating layer for insulating the touch driving electrode layer and the touch sensing electrode layer which constitute the on-cell type touch sensor. Further, the number of processes for manufacturing the display device using the on-cell type touch sensor increases, and thus the manufacturing cost increases.

Accordingly, the need for a touch sensor integrated type display device capable of solving the above-described problems has arisen. An example of the touch sensor integrated type display device includes Korean Patent Application No. 10-2013-0110906.

A touch sensor integrated type display device disclosed in Korean Patent Application Laid-Open No. 10-2013-0110906 divides display common electrodes and allows the display common electrodes to serve as touch sensing electrodes. Hence, the touch sensing electrodes are separately required. Thus, the touch sensor integrated type display device disclosed in Korean Patent Application Laid-Open No. 10-2013-0110906 can solve the problem generated in the add-on type touch sensor and the on-cell type touch sensor.

However, in the touch sensor integrated type display device disclosed in Korean Patent Application Laid-Open No. 10-2013-0110906, when there is a change (i.e., change in a display pattern depending on image information) in the screen in a display drive, an alignment state of liquid crystal is changed and thus a dielectric constant is changed. Hence, a capacitance between a touch driving electrode and the touch sensing electrode is changed. In particular, the change in the dielectric constant depending on the change in the alignment state of the liquid crystal at a boundary between the touch driving electrode and the touch sensing electrode greatly affects the change in the capacitance between the touch driving electrode and the touch sensing electrode. In this state, when a touch driving voltage is applied to the touch driving electrode, the touch sensing electrode recognizes the touch driving voltage as changes in the capacitance.

Accordingly, the touch sensor integrated type display device disclosed in Korean Patent Application Laid-Open No. 10-2013-0110906 erroneously recognizes the touch operation even when there is no touch operation, and thus generates the erroneous operation.

SUMMARY OF THE INVENTION

Accordingly, the present invention is directed to a touch sensor integrated type display device that substantially obviates one or more of the problems due to limitations and disadvantages of the related art.

An object of the present invention is to provide a touch sensor integrated type display device capable of preventing an erroneous touch operation by preventing changes in a dielectric constant of liquid crystal depending on changes in the screen in an image drive of the display device from affecting an electric field between a touch driving electrode and a touch sensing electrode.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purposed of the present invention, as embodied and broadly described, a touch sensor integrated type display device comprises a plurality of first electrodes each including a plurality of first electrode patterns which are adjacent to one another in a first direction and are connected to one another through at least one first bottleneck, the plurality of first electrodes being arranged in the first direction, and a plurality of second electrodes arranged in a second direction crossing the first direction, wherein the plurality of first electrode patterns and the plurality of second electrodes are alternately disposed along the first direction, wherein at least one unit pixel electrode is disposed correspondingly to each of the plurality of first electrode patterns, wherein each first electrode pattern includes an electric field shielding portion disposed between the unit pixel electrode and the second electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts.

Figure 1:
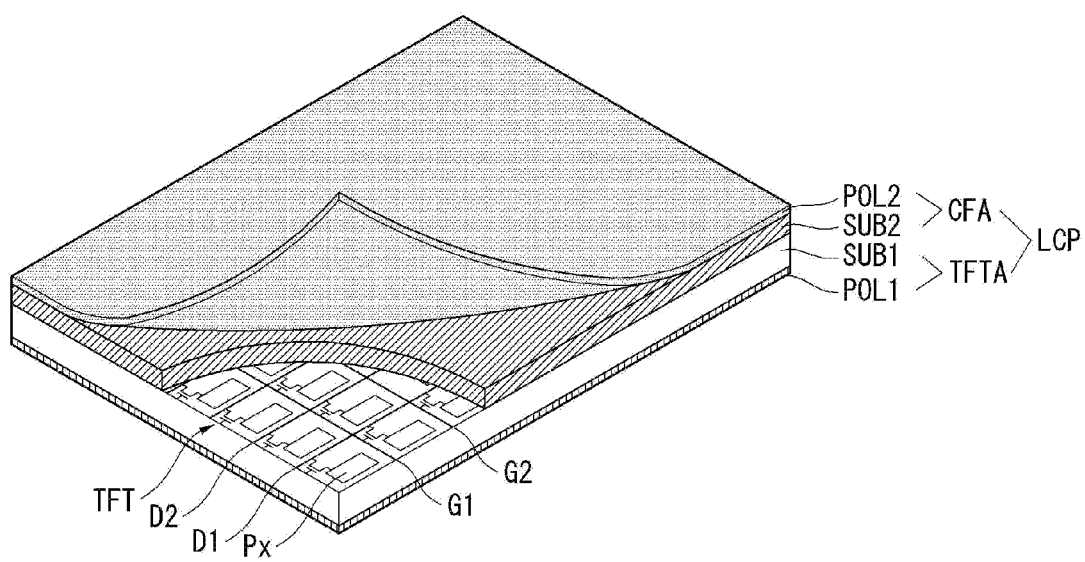
FIG. 1 is a partial exploded perspective view schematically showing a touch sensor integrated type display device according to an exemplary embodiment of the invention.
Figure 2:
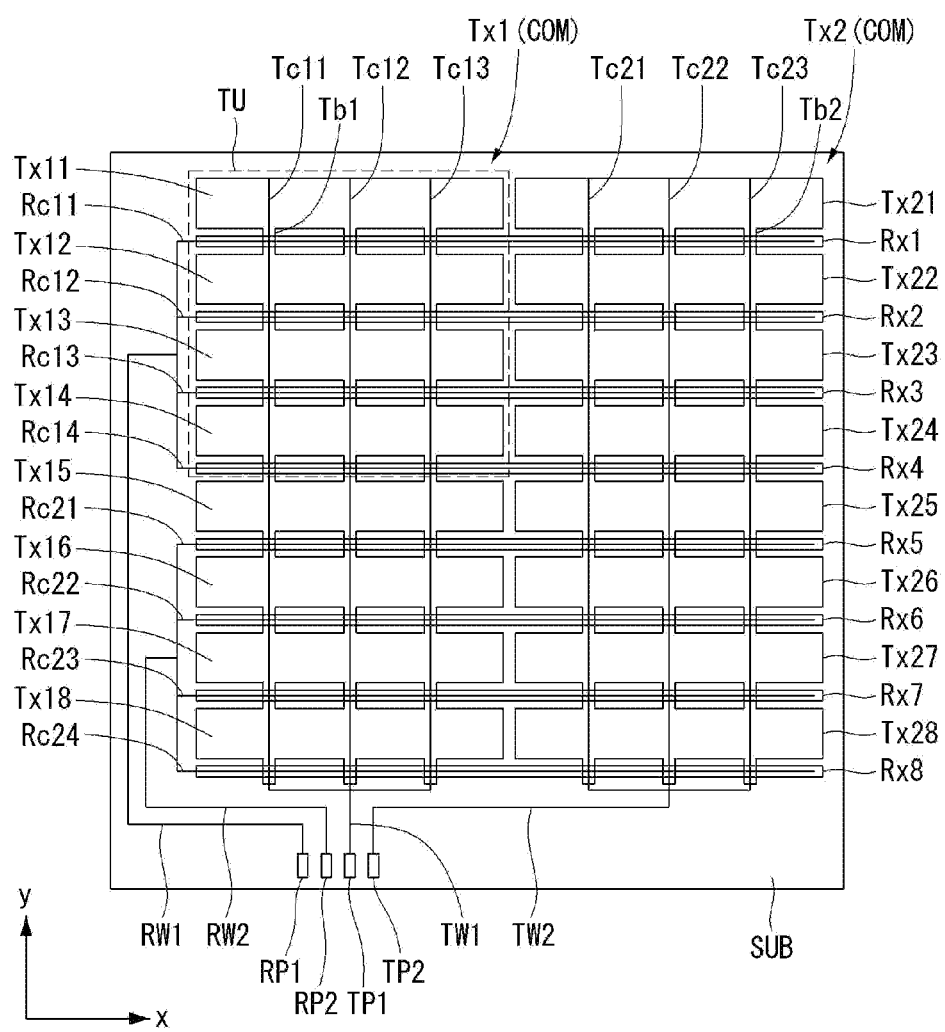
FIG. 2 is a plane view schematically showing a touch sensor integrated type display device according to an exemplary embodiment of the invention.

A touch sensor integrated type display device according to an exemplary embodiment of the invention is described with reference to FIGS. 1 and 2. FIG. 1 is a partial exploded perspective view schematically showing a touch sensor integrated type display device according to an exemplary embodiment of the invention. FIG. 2 is a plane view schematically showing a relationship between a touch driving electrode serving as a common electrode and a touch sensing electrode in a touch sensor integrated type display device according to an exemplary embodiment of the invention.

As shown in FIG. 1, the touch sensor integrated type display device according to the embodiment of the invention includes a liquid crystal display panel LCP having a thin film transistor (TFT) array TFTA and a color filter array CFA which are positioned opposite each other with a liquid crystal layer (not shown) interposed therebetween.

The TFT array TFTA includes a plurality of gate lines G1 and G2 which are formed in parallel in a first direction (for example, x-axis direction) on a first substrate SUB1, a plurality of data lines D1 and D2 which are formed in parallel in a second direction (for example, y-axis direction) to cross over the plurality of gate lines G1 and G2, liquid crystal cells positioned in areas defined by the crossing of the gate lines G1 and G2 and the data lines D1 and D2, thin film transistors TFT formed at crossings of the gate lines G1 and G2 and the data lines D1 and D2, a plurality of pixel electrodes Px for charging the liquid crystal cells to a data voltage, and a plurality of common electrodes (not shown) which are disposed to form an electric field along with the plurality of pixel electrodes Px.

The color filter array CFA includes black matrixes (not shown) and color filters (not shown), which are formed on a second substrate SUB2. Polarizing plates POL1 and POL2 are respectively attached to external surfaces of the first substrate SUB1 and the second substrate SUB2 of the liquid crystal display panel LCP. Alignment layers (not shown) for setting a pre-tilt angle of liquid crystals are respectively formed on inner surfaces of the first substrate SUB1 and the second substrate SUB2 contacting the liquid crystals. A column spacer may be formed between the TFT array TFTA and the color filter array CFA of the liquid crystal display panel LCP to maintain cell gaps of the liquid crystal cells.

The common electrodes are formed on the second substrate SUB2 in a vertical electric field driving manner, such as a twisted nematic (TN) mode and a vertical alignment (VA) mode. Further, the common electrodes are formed on the first substrate SUB1 along with the pixel electrodes Px in a horizontal electric field driving manner, such as an in-plane switching (IPS) mode and a fringe field switching (FFS) mode. In the following description, the embodiment of the invention is described based on the horizontal electric field driving manner as an example.

As shown in FIG. 2, a common electrode COM of the touch sensor integrated type display device according to the embodiment of the invention includes a plurality of electrodes Tx1 and Tx2 which are divided in a first direction (for example, x-axis direction) or a second direction (for example, y-axis direction). In the embodiment of the invention shown in FIG. 2, the divided common electrodes Tx1 and Tx2 are arranged in the first direction (i.e., x-axis direction) and form a plurality of columns. Further, the divided common electrodes Tx1 and Tx2 serve as a plurality of touch driving electrodes constituting a touch sensor.

Each of the plurality of touch driving electrodes Tx1 and Tx2 serving as the common electrode includes a plurality of first and second bottlenecks Tb1 or Tb2 which are arranged in parallel in the x-axis direction along the y-axis direction at crossings of the plurality of touch driving electrodes Tx1 and Tx2 and a plurality of touch sensing electrodes Rx1 to Rx8 and each have a narrow width. More specifically, the first touch driving electrode Tx1 is configured such that a plurality of first touch driving electrode patterns Tx11 to Tx18 arranged in the x-axis direction along the y-axis direction are connected through the first bottlenecks Tb1. Further, the second touch driving electrode Tx2 is configured such that a plurality of second touch driving electrode patterns Tx21 to Tx28 arranged in the x-axis direction along the y-axis direction are connected through the second bottlenecks Tb2 in the same manner as the first touch driving electrode Tx1.

First and second touch driving electrode resistance reducing wires Tc1 to Tc13 and Tc21 to Tc23 are respectively disposed on the first and second touch driving electrodes Tx1 and Tx2, so that the wires Tc11 to Tc13 and Tc21 to Tc23 respectively pass through the first and second bottlenecks Tb1 and Tb2 arranged in the y-axis direction. More specifically, the first touch driving electrode resistance reducing wires Tc11 to Tc13 are disposed so that they pass through the first touch driving electrode patterns Tx11 to Tx18 and the first bottlenecks Tb1 of the y-axis direction connecting the first touch driving electrode patterns Tx11 to Tx18. Further, the second touch driving electrode resistance reducing wires Tc21 to Tc23 are disposed so that they pass through the second touch driving electrode patterns Tx21 to Tx28 and the second bottlenecks Tb2 of the y-axis direction connecting the second touch driving electrode patterns Tx21 to Tx28. The first touch driving electrode resistance reducing wires Tc11 to Tc13 directly contact the first touch driving electrode Tx1 and thus reduce a resistance of the first touch driving electrode Tx1 formed of a transparent conductive material with a high resistance. The second touch driving electrode resistance reducing wires Tc21 to Tc23 directly contact the second touch driving electrode Tx2 and thus reduce a resistance of the second touch driving electrode Tx2 formed of a transparent conductive material with a high resistance.

The first touch driving electrode resistance reducing wires Tc11 to Tc13 are connected to one component outside an area, in which the touch driving electrodes Tx1 and Tx2 and the touch sensing electrodes Rx1 to Rx8 are formed, and are connected to a first touch driving routing pad TP1 through a first touch driving routing wire TW1. The second touch driving electrode resistance reducing wires Tc21 to Tc23 are connected to one component outside the area, in which the touch driving electrodes Tx1 and Tx2 and the touch sensing electrodes Rx1 to Rx8 are formed, and are connected to a second touch driving routing pad TP2 through a second touch driving routing wire TW2.

The embodiment of the invention shown in FIG. 2 shows an example where the touch driving electrodes are implemented as two touch driving lines, namely, a first touch driving line including the first touch driving electrode Tx1 and the first touch driving electrode resistance reducing wires Tc11 to Tc13 and a second touch driving line including the second touch driving electrode Tx2 and the second touch driving electrode resistance reducing wires Tc21 to Tc23.

Further, the embodiment of the invention shown in FIG. 2 shows an example where the three first touch driving electrode resistance reducing wires Tc11 to Tc13 are used to form the first touch driving line, and the three second touch driving electrode resistance reducing wires Tc21 to Tc23 are used to form the second touch driving line. However, the embodiment of the invention is not limited thereto. For example, one or two touch driving electrode resistance reducing wire(s) may be used, or four or more touch driving electrode resistance reducing wires may be used.

As shown in FIG. 2, the touch sensing electrodes Rx1 to Rx8 constituting the touch sensor are arranged in the y-axis direction and form a plurality of rows between the touch driving electrode patterns (i.e., between Tx11, Tx21 and Tx12, Tx22, between Tx12, Tx22 and Tx13, Tx23, between Tx13, Tx23 and Tx14, Tx24, between Tx14, Tx24 and Tx15, Tx25, between Tx15, Tx25 and Tx16, Tx26, between Tx16, Tx26 and Tx17, Tx27, and between Tx17, Tx27 and Tx18, Tx28) which are adjacent to each other in the y-axis direction, and on the lower side of the lowermost touch driving electrode patterns Tx18 and Tx28, so that the touch sensing electrodes Rx1 to Rx8 cross over the first and second bottlenecks Tb1 and Tb2 and the first and second touch driving electrode resistance reducing wires Tc11 to Tc13 and Tc21 to Tc23. Each of the touch sensing electrodes Rx1 to Rx8 may include third bottlenecks (not shown) at crossings of the first and second bottlenecks Tb1 and Tb2 and the touch sensing electrodes.

First to eighth touch sensing electrode resistance reducing wires Rc11 to Rc14 and Rc21 to Rc24 for the resistance reduction are respectively formed on the touch sensing electrodes Rx1 to Rx8. The touch sensing electrodes Rx1 to Rx8 are separated from one another, but may be properly grouped using the touch sensing electrode resistance reducing wires to form touch sensing channels. For example, in the embodiment of the invention shown in FIG. 2, the first to fourth touch sensing electrodes Rx1 to Rx4 and the first to fourth touch sensing electrode resistance reducing wires Rc11 to Rc14 respectively contacting the first to fourth touch sensing electrodes Rx1 to Rx4 may be grouped to form a first touch sensing channel, and the fifth to eighth touch sensing electrodes Rx5 to Rx8 and the fifth to eighth touch sensing electrode resistance reducing wires Rc21 to Rc24 respectively contacting the fifth to eighth touch sensing electrodes Rx5 to Rx8 may be grouped to form a second touch sensing channel.

The first touch sensing channel (Rx1 to Rx4 and Rc1 to Rc14) is connected to one component outside the area, in which the touch driving electrodes Tx1 and Tx2 and the touch sensing electrodes Rx1 to Rx8 are formed, and is connected to a first touch sensing routing pad RP1 through a first touch sensing routing wire RW1. The second touch sensing channel (Rx5 to Rx8 and Rc21 to Rc24) is connected to one component outside the area, in which the touch driving electrodes Tx1 and Tx2 and the touch sensing electrodes Rx1 to Rx8 are formed, and is connected to a second touch sensing routing pad RP2 through a second touch sensing routing wire RW2.

As described above, the touch sensor integrated type display device according to the embodiment of the invention includes the first and second touch driving electrodes Tx1 and Tx2 and the first to eighth touch sensing electrodes Rx1 to Rx8. As shown in FIG. 2, the plurality of touch driving electrodes Tx1 and Tx2 and the plurality of touch sensing electrodes Rx1 to Rx8 may be properly grouped using the first and second touch driving electrode resistance reducing wires Tc11 to Tc13 and Tc21 to Tc23 and the first to eighth touch sensing electrode resistance reducing wires Rc11 to Rc14 and Rc21 to Rc24 to unit touch recognition blocks TU for the touch recognition. FIG. 2 shows an example where the two touch driving electrodes Tx1 and Tx2 and the eight touch sensing electrodes Rx1 to Rx8 form the four unit touch recognition blocks TU.

All of the above-described touch driving electrodes Tx1 and Tx2 also serve as the common electrode COM and are formed on the first substrate SUB1 of the TFT array TFTA along with the pixel electrodes Px in the horizontal electric field driving manner. The pixel electrodes Px are formed in areas defined by the crossing of the gate lines and the data lines.

Each of the first and second touch driving electrode patterns Tx11 to Tx18 and Tx21 to Tx28 serving as the common electrode COM may be formed correspondingly to a plurality of unit pixel electrodes (each including a plurality of subpixels required to represent color) of one line.

As described above, in the touch sensor integrated type display device according to the embodiment of the invention, each of the first and second touch driving electrode patterns Tx11 to Tx18 and Tx21 to Tx28 may be formed correspondingly to the plurality of unit pixel electrodes of one line. Further, each of the first and second touch driving electrode resistance reducing wires Tc11 to Tc13 and Tc21 to Tc23 may be formed correspondingly to one data line or the n data lines, where n is a natural number equal to or greater than 2. Further, each of the touch sensing electrodes Rx1 to Rx8 may be formed correspondingly to one gate line or the n gate lines according to the rule.

Figure 3:
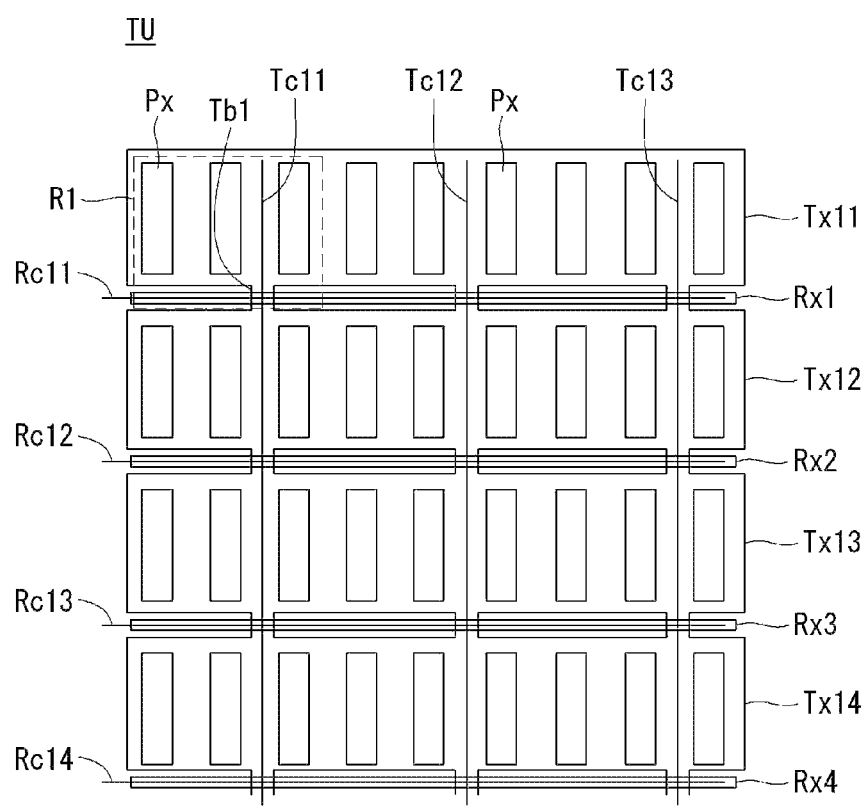
FIG. 3 is a plane view schematically showing a relationship between common electrodes (touch driving electrodes), touch sensing electrodes, and pixel electrodes in a unit touch recognition block TU shown in FIG. 2.

A relationship between the common electrodes (the touch driving electrodes), the touch sensing electrodes, and the pixel electrodes in the touch sensor integrated type display device according to the embodiment of the invention is described in detail below with reference to FIG. 3. FIG. 3 is a plane view schematically showing a relationship between the common electrodes (the touch driving electrodes), the touch sensing electrodes, and the pixel electrodes in the unit touch recognition block TU shown in FIG. 2. Since the four unit touch recognition blocks TU shown in FIG. 2 have substantially the same configuration, only one unit touch recognition block is described in FIG. 3 for the sake of brevity and ease of reading.

As shown in FIG. 3, the plurality of pixel electrodes Px are arranged in parallel in each of the first touch driving electrode patterns Tx11 to Tx18 along an arrangement direction of the touch driving electrode patterns Tx11 to Tx18. Namely, the plurality of unit pixel electrodes are arranged in a line in the x-axis direction in each of the first touch driving electrode patterns Tx11 to Tx18. FIG. 3 shows an example where the three unit pixel electrodes (each including, for example, three subpixels, and the subpixel is hereinafter referred to as the pixel electrode) are arranged in each of the touch driving electrode patterns Tx11 to Tx14.

Figure 4A:
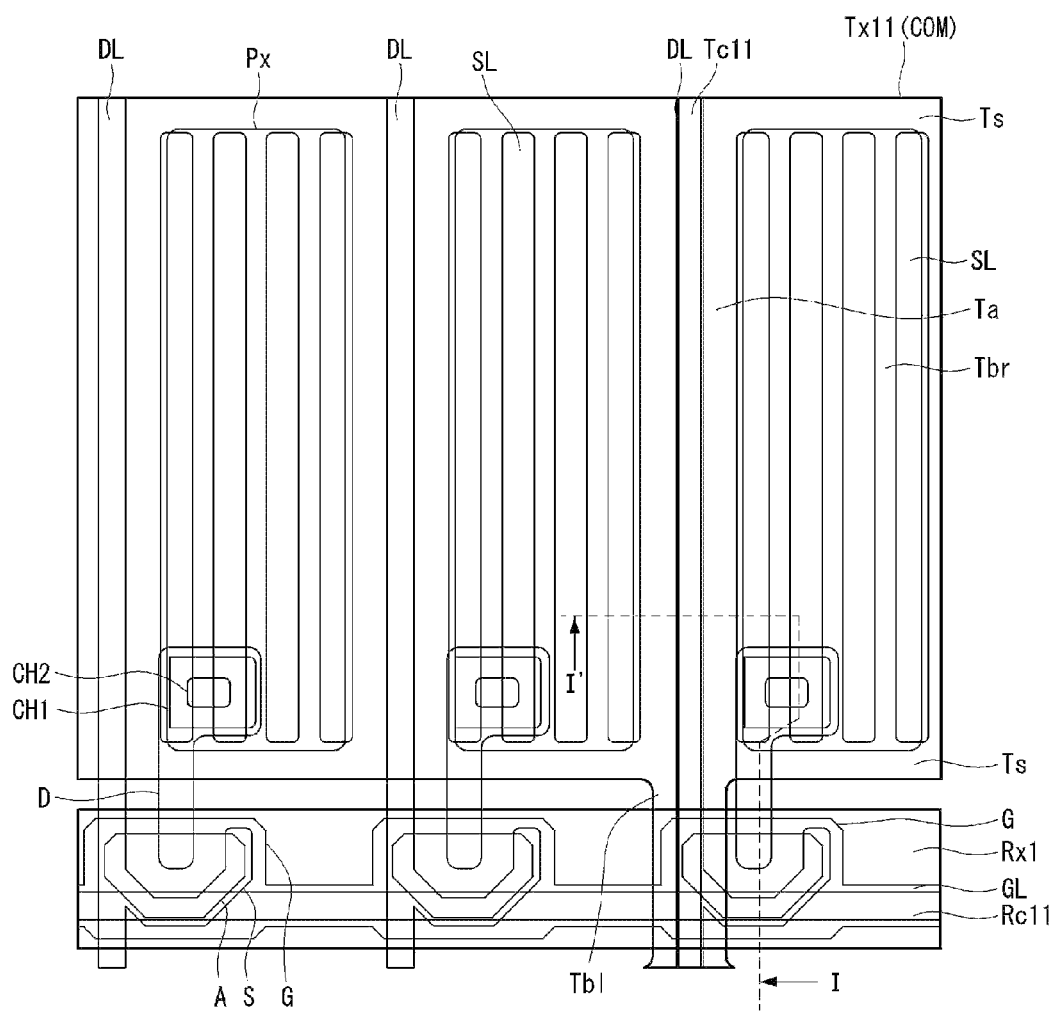
FIG. 4A is a plane view showing a region R1 shown in FIG. 3.
Figure 4B:
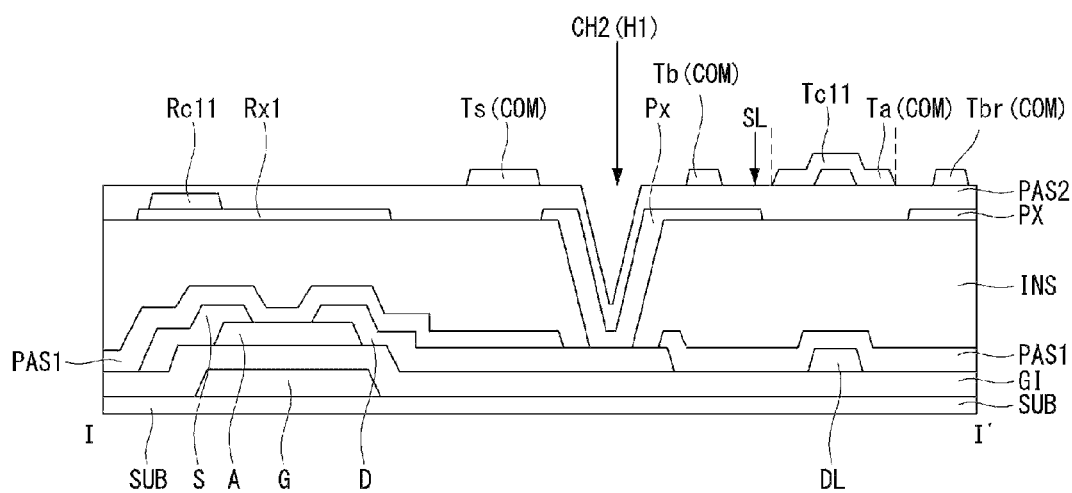
FIG. 4B is a cross-sectional view taken along line I-I' of FIG. 4A.

Next, a cross-sectional structure of the touch sensor integrated type display device according to the embodiment of the invention is described with reference to FIGS. 4A and 4B. FIG. 4A is a plane view showing the touch sensor integrated type display device according to the embodiment of the invention in a region R1 shown in FIG. 3. FIG. 4B is a cross-sectional view taken along line I-I' of FIG. 4A.

For the sake of simplicity, the following description will be given focusing on the pixel electrodes Px disposed in the region R1 including a partial area of the touch driving electrode pattern Tx11 and a partial area of the touch sensing electrode Rx1 adjacent to the touch driving electrode pattern Tx11. In the embodiment of the invention, 'Px' denotes the subpixels required to represent the color, the three subpixels form one unit pixel electrode, and each subpixel is simply referred to as the pixel electrode.

As shown in FIGS. 3, 4A, and 4B, the touch sensor integrated type display device according to the embodiment of the invention includes gate lines GL and data lines DL formed to cross over each other on a substrate SUB1 of a thin film transistor array TFTA, thin film transistors TFT formed at crossings of the gate lines GL and the data lines DL, pixel electrodes Px formed in areas defined by the crossing of the gate lines GL and the data lines DL, and common electrodes COM positioned opposite the pixel electrodes Px. In the embodiment of the invention, the common electrodes COM serve as touch driving electrodes Tx. Thus, the common electrode COM is hereinafter referred to as the touch driving electrode Tx, the touch driving electrode Tx serving as the common electrode, or the common electrode COM serving as the touch driving electrode, if necessary or desired.

In the above configuration of the display device, the gate line GL is formed on the substrate SUB1, and a gate insulating layer GI is formed on the gate line GL. An active layer A, a source electrode S, and a drain electrode D constituting the thin film transistor TFT are formed on the gate insulating layer GI.

Namely, the thin film transistor TFT includes a gate electrode G extending from the gate line GL formed on the substrate SUB1, the active layer A formed in an area corresponding to the gate electrode G on the gate insulating layer GI covering the gate line GL and the gate electrode G, and the source electrode S and the drain electrode D which are separated from each other on the gate insulating layer GI and extend from the data line DL, so as to expose a portion of the active layer A.

The embodiment of the invention has described as an example a thin film transistor having a gate bottom structure, in which the gate electrode is formed under the source and drain electrodes, but is not limited to this example. The embodiment of the invention should be understood that a thin film transistor having a gate top structure, in which the gate electrode is formed on the source and drain electrodes, is available. Since the thin film transistor having the gate top structure is well known, a detailed description thereof will be omitted.

A first passivation layer PAS1 covering the thin film transistor TFT and the data line DL is formed on the gate insulating layer GI, on which the thin film transistor TFT and the data line DL are formed, and an organic insulating layer INS, such as photoacryl, for planarization is formed on the first passivation layer PAS1. A first contact hole CH1 exposing a portion of the drain electrode D is formed in the first passivation layer PAS1.

The pixel electrodes Px are formed on the organic insulating layer INS and are respectively arranged in pixel areas defined by the crossing of the data lines DL and the gate lines GL. The organic insulating layer INS includes a second contact hole CH2 exposing the portion of the drain electrode D exposed through the first contact hole CH1 of the first passivation layer PAS1. The pixel electrode Px is connected to the drain electrode D of the thin film transistor TFT through the second contact hole CH2 passing through the organic insulating layer INS.

The touch sensing electrode Rx1 is formed on the organic insulating layer INS in parallel with the gate line GL and is positioned between the adjacent pixel electrodes Px arranged in the y-axis direction. The touch sensing electrode Rx1 may include a third bottleneck (not shown) having a narrow width at a crossing of the first and second bottlenecks Tb1 and Tb2 of the touch driving electrode and the touch sensing electrode Rx1. The touch sensing electrode resistance reducing wire Rc11 is formed on the touch sensing electrode Rx1 in parallel with the gate line GL.

A second passivation layer PAS2 is formed on the organic insulating layer INS, on which the pixel electrodes Px, the touch sensing electrode Rx1, and the touch sensing electrode resistance reducing wire Rc11 are formed.

The touch driving electrode resistance reducing wire Tc11 is formed on the second passivation layer PAS2 and overlaps the data line DL. The touch driving electrode resistance reducing wire Tc11 is formed to pass through the first bottleneck Tb1 of the touch driving electrode pattern Tx11.

The touch driving electrode pattern Tx11 serving as the common electrode is formed on the second passivation layer PAS2, on which the touch driving electrode resistance reducing wire Tc11 is formed. The touch driving electrode pattern Tx11 is formed to overlap the pixel electrode Px. The touch driving electrode pattern Tx11 includes a plurality of slits SL, so that a horizontal electric field is easily formed between the pixel electrodes Px and the touch driving electrode pattern Tx11. Thus, the pixel electrodes Px formed on the organic insulating layer INS do not have the slit, and the touch driving electrode pattern Tx11 formed on the second passivation layer PAS2 has the slits.

Figure 5:
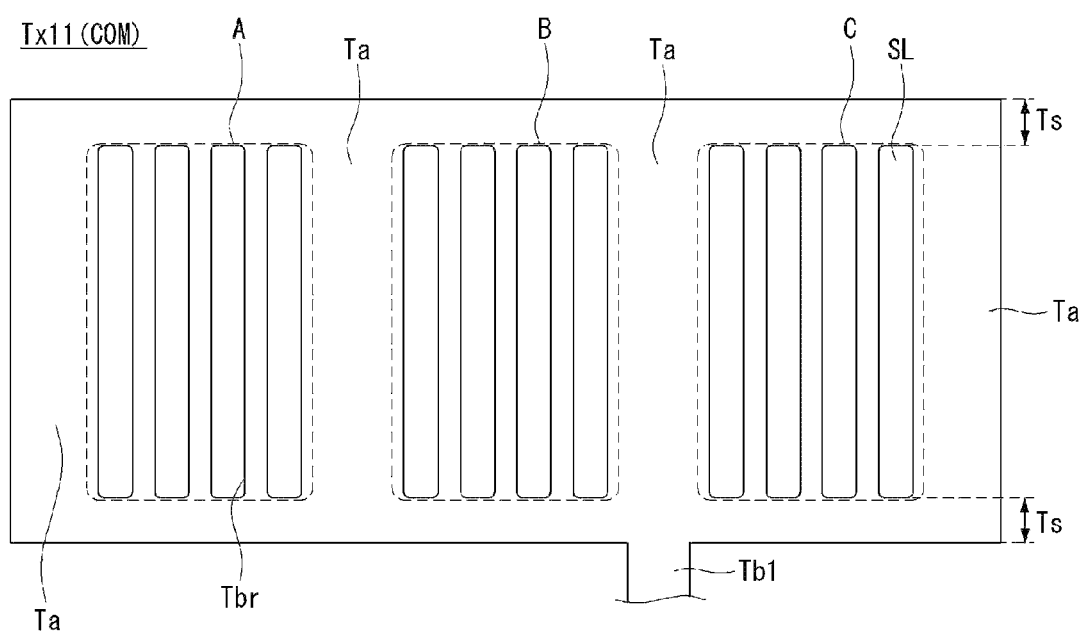
FIG. 5 is a plane view showing a touch driving electrode pattern in a region R1 shown in FIG. 3.

Next, the touch driving electrode pattern Tx11 according to the embodiment of the invention is described in detail with reference to FIG. 5. FIG. 5 is a plane view showing the touch driving electrode pattern Tx11 in the region R1 shown in FIG. 3.

As shown in FIG. 5, the touch driving electrode pattern Tx11 is a rectangular pattern having the plurality of slits SL formed in overlap areas A, B, and C between the pixel electrodes Px and the touch driving electrode pattern Tx11. The touch driving electrode pattern Tx11 includes electric field shielding portions Ts which are separated from each other and are arranged in parallel with each other, connection portions Ta which connect the electric field shielding portions Ts outside the overlap areas A, B, and C, and branches Tbr which are disposed in parallel in each of the overlap areas A, B, and C to form the slits SL. FIG. 5 shows that the branches Tbr connect the electric field shielding portions Ts on an upper side and a lower side of the branches Tbr, but the embodiment of the invention is not limited thereto. For example, the electric field shielding portions Ts may be separated from each other. The electric field shielding portion Ts of the touch driving electrode pattern Tx11 is positioned between the pixel electrodes Px and the touch sensing electrode Rx and shields an electric field generated between the pixel electrodes Px and the touch sensing electrode Rx.

As described above, in the touch sensor integrated type display device according to the embodiment of the invention, the pixel electrode Px and the touch sensing electrode Rx are formed on the organic insulating layer INS to be separated from each other, and the electric field shielding portion Ts of the touch driving electrode pattern Tx11 is formed on the second passivation layer PAS2 covering the pixel electrode Px and the touch sensing electrode Rx at a position between the pixel electrode Px and the touch sensing electrode Rx. Even when there is a change (i.e., change in a display pattern depending on image information) in the screen in an image drive of the touch sensor integrated type display device, an electric field resulting from a pixel voltage is not applied to liquid crystal of a boundary between the touch driving electrode and the touch sensing electrode and is shielded by the electric field shielding portion Ts of the touch driving electrode pattern. Thus, because the pixel voltage does not generate changes in an alignment state of the liquid crystal of the boundary between the touch driving electrode and the touch sensing electrode, the erroneous touch operation may be prevented.

Although embodiments have been described with reference to a number of illustrative embodiments thereof, it should be understood that numerous other modifications and embodiments can be devised by those skilled in the art that will fall within the scope of the principles of this disclosure. For example, in the embodiment of the invention, the first passivation layer for protecting the thin film transistor and the organic insulating layer for the planarization are individually formed. However, one of the first passivation layer and the organic insulating layer may perform the two functions of the protection and the planarization.

It will be apparent to those skilled in the art that various modifications and variations can be made in the touch sensor integrated type display device of the present invention without departing from the spirit or scope of the invention. Thus, it is intended that the present invention cover the modifications and variations of this invention provided they come within the scope of the appended claims and their equivalents.

What is claimed is:

1. A touch sensor integrated type display device, comprising:
    a plurality of first electrodes being arranged in a first direction and, each including a plurality of first electrode patterns which are adjacent to one another in a second direction crossing the first direction and are connected to one another through at least one first bottleneck; and
    a plurality of second electrodes arranged in the second direction,
    wherein the plurality of first electrode patterns and the plurality of second electrodes are alternately disposed along the second direction,
    wherein at least one unit pixel electrode is disposed correspondingly to each of the plurality of first electrode patterns, and
    wherein each first electrode pattern includes an electric field shielding portion disposed horizontally between the unit pixel and the second electrode on a passivation layer that covers the unit pixel electrode and the second electrode to prevent erroneous touch operations.

2. The touch sensor integrated type display device of claim 1, wherein the unit pixel electrode is disposed on an insulation layer covering thin film transistors located at an area adjacent to crossings of gate lines and data lines,
    wherein each second electrode is disposed on the insulation layer to be separated from the unit pixel electrode.

3. The touch sensor integrated type display device of claim 1, further comprising a first electrode resistance reducing wire configured to contact the plurality of first electrode patterns and pass through the first bottleneck.

4. The touch sensor integrated type display device of claim 3, wherein the first bottleneck is disposed one to the n unit pixel electrodes, where n is a natural number.

5. The touch sensor integrated type display device of claim 4, wherein the one first electrode resistance reducing wire is disposed one to the one unit pixel electrode.

6. The touch sensor integrated type display device of claim 1, wherein each second electrode includes a third bottleneck having a narrow width at a crossing of the first bottleneck and the second electrode.

7. The touch sensor integrated type display device of claim 6, further comprising a second electrode resistance reducing wire configured to contact the second electrode, cross over the first bottleneck, and pass through the third bottleneck.

8. The touch sensor integrated type display device of claim 1, wherein the first electrodes are touch driving electrodes serving as a common electrode, and the second electrodes are touch sensing electrodes.

9. The touch sensor integrated type display device of claim 1, wherein first electrode patterns adjacent to each other are connected through a plurality of first bottlenecks.

* * * * *